United States Patent
Beg et al.

(10) Patent No.: US 12,403,456 B1
(45) Date of Patent: Sep. 2, 2025

(54) NON-NOBLE CuO-CeO$_2$/Nb$_2$O$_5$ CATALYSTS FOR LOW-TEMPERATURE OXIDATION OF CARBON MONOXIDE

(71) Applicant: United Arab Emirates University, Al Ain (AE)

(72) Inventors: Mirza Belal Beg, Al Ain (AE); Labeeb Ali, Al Ain (AE); Mohammednoor Al Tarawneh, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/770,008

(22) Filed: Jul. 11, 2024

(51) Int. Cl.
*C01B 32/50* (2017.01)
*B01J 23/20* (2006.01)
(Continued)

(52) U.S. Cl.
CPC ........... *B01J 23/8474* (2013.01); *B01J 23/20* (2013.01); *B01J 37/0201* (2013.01);
(Continued)

(58) Field of Classification Search
CPC ....... B01J 23/20; B01J 23/8474; C01B 32/40; C01B 32/50
See application file for complete search history.

(56) References Cited

U.S. PATENT DOCUMENTS

| | | | | |
|---|---|---|---|---|
| 11,890,608 B2 * | 2/2024 | Liu | ...................... | B01J 37/0201 |
| 2010/0266481 A1 * | 10/2010 | Haas | ........................ | C01B 32/50 |
| | | | | 423/502 |

FOREIGN PATENT DOCUMENTS

| | | | | |
|---|---|---|---|---|
| CN | 115627494 A | * | 1/2023 | |
| WO | WO-2004052520 A2 | * | 6/2004 | ............. A24B 15/28 |
| WO | WO-2018097550 A2 | * | 10/2010 | .............. B01J 23/42 |
| WO | WO-2016069856 A1 | * | 5/2016 | .......... B01J 23/8892 |

OTHER PUBLICATIONS

Leung et al. (Copper oxide catalyst supported on niobium oxide for CO oxidation at low Temperatures, Catalysis Communications 97 (2017) 42-46).*

(Continued)

*Primary Examiner* — Jun Li
(74) *Attorney, Agent, or Firm* — MH2 Technology Law Group, LLP

(57) ABSTRACT

There is disclosed a highly efficient and economical catalyst for carbon monoxide (CO) oxidation at low temperatures, using a non-noble transition metal composition of copper oxide (CuO), cerium oxide (CeO$_2$), and niobium oxide (Nb$_2$O$_5$). The catalyst, designated as 10CuCeNb, is synthesized via the wet impregnation method and is composed of with 10% CuO—CeO$_2$ supported on Nb$_2$O$_5$. It shows a significantly improved performance with full CO conversion achieved at relatively low temperature of 150° C. It demonstrates high stability over a 12-hour reaction time. The activation energy (Ea) is 23.1 kJ mol$^{-1}$, supporting low-temperature CO oxidation with minimal energy input. The catalyst's high activity and stability are attributed to the formation of oxygen vacancies and active Lewis acid sites generated from the synergistic interaction between CuO, CeO$_2$, and Nb$_2$O$_5$. This catalyst offers a cost-effective alternative to noble metal catalysts for use in catalytic converters, effectively reducing CO emissions in industrial and environmental applications.

8 Claims, 5 Drawing Sheets

(51) Int. Cl.
  *B01J 23/847* (2006.01)
  *B01J 37/02* (2006.01)
  *B01J 37/04* (2006.01)
  *B01J 37/08* (2006.01)

(52) U.S. Cl.
  CPC .......... *B01J 37/0236* (2013.01); *B01J 37/04* (2013.01); *B01J 37/08* (2013.01); *C01B 32/50* (2017.08)

(56) References Cited

OTHER PUBLICATIONS

Zhang (CeO2 nanoparticles modified by CuO nanoparticles for low-temperature CO oxidation with high catalytic activity, Journal of Physics and Chemistry of Solids 147 (2020) 109651).*

Machine translation of WO2018/097550, publication date May 31, 2018.*

Beg et al. Non-noble catalysts formulations using CuO-CeO2/Nb2O5 for low-temperature catalytic oxidation of carbon monoxide, Journal of Environmental Chemical Engineering 12 (2024) 113177.*

Jung et al., Selective oxidation of CO over CuO—CeO2 catalyst: effect of calcination temperature, Catalysis Today 93-95 (2004) 183-190.*

Cámara et al., Influence of calcination temperature and atmosphere preparation parameters on CO-PROX activity of catalysts based on CeO2/CuO inverse configurations, Journal of Power Sources 196 (2011) 4364-4369.*

Cecilia et al., Catalytic Behaviour of CuO—CeO2 Systems Prepared by Different Synthetic Methodologies in the CO-PROX Reaction under CO2—H2O Feed Stream, Catalysts 2017, 7, 160; doi: 10.3390/catal7050160.*

* cited by examiner

NON-NOBLE CuO-CeO$_2$/Nb$_2$O$_5$ CATALYSTS FOR LOW-TEMPERATURE OXIDATION OF CARBON MONOXIDE

FIELD OF THE INVENTION

The present invention relates to the field of catalytic oxidation, and more particularly to a non-noble metal catalyst composed of oxides of cerium, copper and niobium for the low-temperature oxidation of carbon monoxide (CO) in catalytic converters.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

As the population grows rapidly, so does the demand for energy, leading to the expansion of various industries to meet these demands. However, these industries release toxic gases, contributing to global warming. Carbon monoxide (CO), a toxic gas resulting from the incomplete combustion of fossil fuels, poses significant risks to humans, plants, animals, and the environment. Automobile exhaust, industrial activities and heating systems are the primary sources of CO emissions globally. CO lacks both color and odor, making it particularly insidious to human health and contributing to environmental pollution. It is predominantly found in the flue gas produced by industries and in the exhaust emissions of motor vehicles. In most cases, CO concentrations in polluted air are significantly lower, often in the 50-50000 ppm range, making homogeneous CO combustion almost difficult.

Among various existing methods for mitigating CO emissions, catalytic oxidation technology presents a promising solution by converting CO into less harmful compounds, such as carbon dioxide (CO$_2$), at suitable temperatures. This technology primarily employs catalysts to facilitate the oxidation process in catalytic converters. CO oxidation catalysts are often designed to have a variety of desirable physicochemical properties, such as a wide operating temperature range, no need for activation before use, the ability to regenerate, and a long lifetime. There are various types of CO oxidation catalysts have been studied such as noble metal catalysts and transition metal oxide. Numerous noble metal-based catalysts for CO oxidation have been developed with a prime focus on the use of gold (Au), platinum (Pt), rhodium (Rh), and palladium (Pd), as the active component. These catalysts often display high catalytic activity for CO oxidation. However, these catalysts face several major drawbacks such as a) High Cost and Scarcity: Noble metals are expensive and scarce, limiting their practical and widespread application, b) Rapid Deactivation: Noble metal catalysts can deactivate quickly under high CO loads, reducing their long-term effectiveness and necessitating frequent replacement or regeneration. Significant amount of CO adsorption on the surface of the noble metal can poisoning the catalyst.

Analysis of related prior art in the field shows discussions about using non-noble metal catalysts, such as oxides of cobalt, nickel, manganese, and iron for CO oxidation and demonstrate significant activity comparable to noble metals. These materials are abundant and more affordable, making them viable candidates for large-scale application. However, they pose challenges in their effective utilization. They can be unstable when exposed to CO$_2$ and H$_2$O in the feed gas stream. This instability make them vulnerable to deactivation, reducing the catalysts' effectiveness over time. Effective CO oxidation catalysts need to possess a variety of desirable physicochemical properties, such as a wide operating temperature range, no need for pre-activation, the ability to regenerate, and a long lifetime. Achieving this balance of properties in the metal catalysts remains a significant research focus.

To address these issues, there is an ongoing effort to develop catalysts that are not only effective and stable, but also economically viable. It is crucial that the components of these catalysts are readily available in sufficient quantities to support large-scale applications. The focus is on finding materials that can efficiently convert CO to CO$_2$ with minimal energy input or at low temperatures, thereby reducing pollution in a sustainable manner. This conversion should be achieved without compromising the catalyst's activity and efficiency for oxidation reaction. The development of such catalysts would represent a significant advancement in environmental protection and public health, providing a feasible solution to the growing problem of CO emissions from various industrial and residential sources.

Based on the above explained, there exists a need for catalysts that are highly efficient, stable, and cost-effective, capable of maintaining high activity at low temperatures, which overcomes the drawbacks of the traditionally employed systems.

SUMMARY OF THE INVENTION

Therefore it is an object of the present invention to propose non-noble metal catalysts of CuO, CeO$_2$, and Nb$_2$O$_5$ for low-temperature CO oxidation in catalytic converters, offering cost-effectiveness, high activity and long-term stability.

There is disclosed a catalyst for oxidation of carbon monoxide (CO) to carbon dioxide (CO$_2$) comprising: Copper oxide (CuO); Cerium oxide (CeO$_2$); and Niobium oxide (Nb$_2$O$_5$), wherein the catalyst, designated as 10CuCeNb, is composed of 10 weight % of CuO—CeO$_2$ supported on Nb$_2$O$_5$ and a synergistic interaction between the cerium oxide doped with the copper oxide and the niobium oxide support enhances catalytic activity at temperatures as low as 150° C.

In an embodiment of the present invention, 10CuCeNb catalyst with enhanced catalytic activity, achieves complete oxidation of CO at a temperature of 150° C.

In an embodiment of the present invention, the catalyst exhibits a low activation energy (Ea) of 21.3 kJ mol$^1$, facilitating CO oxidation at low temperatures or with less energy input.

In another embodiment of the present invention, the catalyst maintains stability and CO conversion rates over an extended period of reaction time of at least 12 hours, unaffected by the presence or absence of water and carbon dioxide in feed gas stream.

In an embodiment of the present invention, the cerium oxide readily generates oxygen vacancies or surface defects within its lattice and provides oxygen storage capacity.

In another embodiment of the present invention, the niobium oxide acts as a support material enhancing redox characteristics and developing active acidic sites (Lewis acid sites).

In an embodiment of the present invention, the synergistic interaction between the cerium oxide doped with the copper oxide and the niobium oxide support creates a solid solution that generates oxygen vacancies, thereby enhancing catalytic activity.

In an embodiment of the present invention, doping the cerium oxide with the copper oxide disrupts charge balance within the ceria lattice, creating oxygen vacancies that act as active sites for adsorption and activation of the CO molecules.

In an embodiment of the present invention, the incorporation of the CuO and the $CeO_2$ into the niobium species results in highly distorted octahedrally coordinated $NbO_6$ species.

According to the embodiment of the present invention, the $NbO_6$ species act as Lewis acid sites and form Nb—O—Ce bonds, generating oxygen vacancies for CO adsorption and oxidation.

According to the present invention, CO oxidation follows the Mars-van Krevelen (MvK) mechanism wherein CO molecules chemisorb on the catalyst interface forming Cu-carbonyl species that are oxidized to $CO_2$ by lattice oxygen and an oxygen vacancy (Ov) thereby created in the lattice is replenished by adsorbed oxygen, enabling continuous $CO_2$ formation via further carbonyl species reactions.

In another embodiment of the present invention, the catalyst is synthesized via wet impregnation method, wherein 10 weight % of CuO—$CeO_2$ precursors are combined with a pre-determined mass of niobium oxide in a controlled manner to form a slurry, that is stirred, dried, and calcined at approximately 500° C. for 4 hours in the presence of zero air.

There is disclosed a method for catalytic oxidation of carbon monoxide (CO) to carbon dioxide ($CO_2$), comprising: providing a catalyst, designated as 10CuCeNb, composed of 10 weight % of Copper oxide (CuO)-Cerium oxide ($CeO_2$) supported on Niobium oxide ($Nb_2O_5$); exposing a CO-containing gas stream to the catalyst composition at a temperature as low as 150° C.; and oxidizing the CO to $CO_2$, wherein the catalyst exhibits enhanced activity due to synergistic interaction between the CuO-doped $CeO_2$ and the $Nb_2O_5$, and achieves complete CO oxidation at a temperature of 150° C.

In one embodiment of the present invention, the CO-containing gas stream comprises 10 vol. % CO and 20 vol. % Oxygen ($O_2$) with the balance being argon (Ar), used in a continuous-flow fixed-bed reactor system.

In an embodiment of the present invention, the catalyst exhibits an activation energy (Ea) of 21.3 kJ $mol^{-1}$, supporting CO oxidation at low temperatures or with less energy input.

In another embodiment of the present invention, the catalyst maintains stability and consistent CO conversion rates for at least 12 hours.

In an embodiment of the present invention, CO oxidation follows the Mars-van Krevelen (MvK) mechanism route, wherein CO molecules chemisorb on the catalyst interface to form Cu-carbonyl species that are oxidized to $CO_2$ by lattice oxygen and an oxygen vacancy (Ov) thereby created in the lattice is subsequently filled by adsorbed oxygen, enabling continuous $CO_2$ formation through further carbonyl species reactions.

In an embodiment of the present invention, the synergistic interaction between the CuO—CeO2 and the niobium oxide support creates a solid solution that generates oxygen vacancies, thereby enhancing catalytic activity.

In another embodiment of the present invention, doping the copper oxide into the cerium oxide, disrupts charge balance within the ceria lattice to create oxygen vacancies, that serve as active sites for adsorption and activation of the CO molecules.

In an embodiment of the present invention, the niobium oxide enhances redox characteristics and develops active acidic sites (Lewis acid sites) upon incorporation with the CuO and the $CeO_2$, thereby generating oxygen vacancies for CO adsorption and oxidation.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
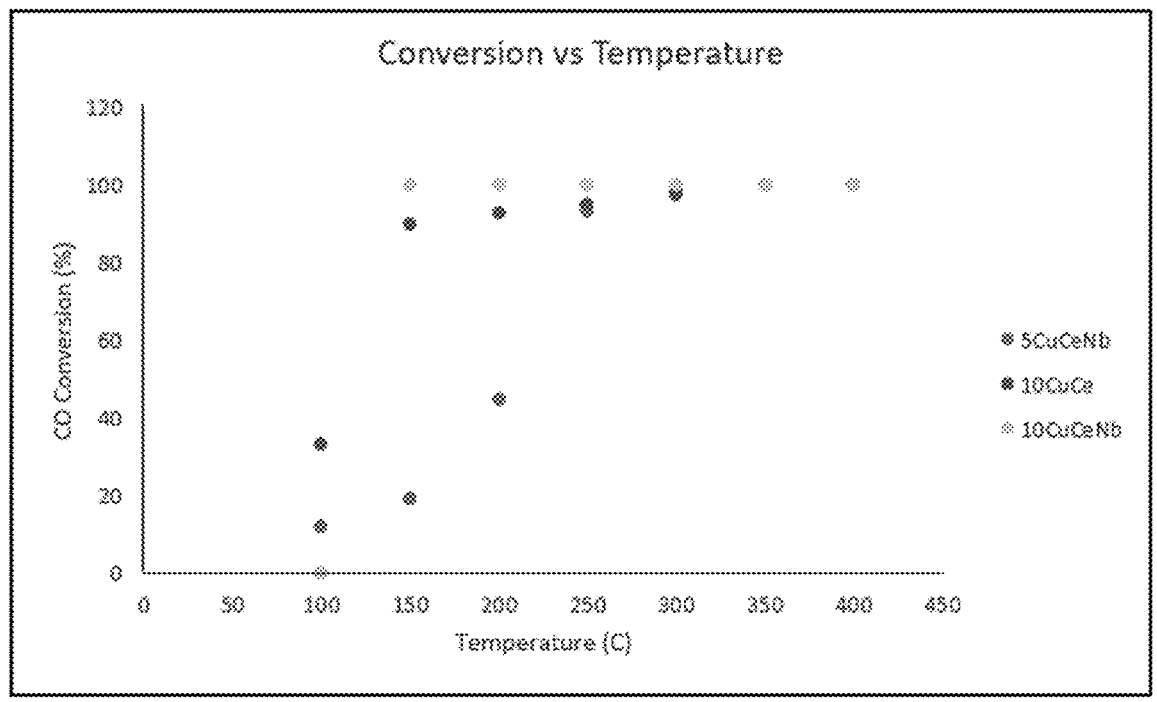
FIG. 1 shows the light-off curves of CO Oxidation reaction obtained over the different prepared catalysts, and the comparative results of $T_{100}$ (° C.) conversion temperature for all the prepared catalysts, in accordance with the present invention.

The aspects of the proposed non-noble transition metal catalyst 10CuCeNb for low-temperature CO oxidation—according to the present invention will be described in conjunction with FIGS. 1-5. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention introduces a catalyst composed of non-noble transition metals comprising copper oxide (CuO), cerium oxide ($CeO_2$), and niobium oxide ($Nb_2O_5$) to be used in catalytic converters for efficient oxidation of carbon monoxide (CO). The catalytic converter aims to transform harmful carbon monoxide (CO) into less harmful compounds through catalytic oxidation reactions. Notably, the catalyst exhibits high activity, especially at low temperatures, enabling efficient conversion of carbon monoxide (CO) into less harmful carbon dioxide ($CO_2$) at these lower temperatures. In an embodiment of the present invention, the CuO—$CeO_2$/$Nb_2O_5$ catalyst formulation achieves total/complete oxidation at a relatively low temperature of 150° C. The invention leverages affordable and readily available non-noble metals (copper, cerium, and niobium) instead of expensive and scarce traditional noble metals (such as platinum and palladium) for catalytic oxidation. It thereby offers an efficient sustainable and economically viable alternative for effectively mitigating pollution due to CO emissions.

In a specific embodiment of the invention, the non-noble catalyst, designated as 10CuCeNb, has a formulation composed of 10 weights percent of $CuO$—$CeO_2$ supported on $Nb_2O_5$. It is synthesized via the wet impregnation method using $CuO$—$CeO_2$ precursors supported on niobium oxide with varying loading levels. The synergistic interaction between cerium oxide, copper oxide, and niobium oxide creates a solid solution that generates oxygen vacancies, thereby enhancing the catalytic activity of 10CuCeNb. This catalyst endures high stability over a long reaction time, demonstrates high selectivity, and high activity for CO oxidation reaction at low temperature conditions. It has a low activation energy of Ea=21.3 kJ mol$^{-1}$, allowing CO oxidation to occur at lower temperatures or with less energy input and the kinetics parameters reveal that the fitted activation energy (23.1 kJ mol$^{-1}$) inversely follows the CO activity trends. The catalyst achieves full CO conversion at temperatures as low as 150° C. It remains stable over time under the reaction conditions and maintains a consistently high CO conversion rate throughout a 12-hour time-on-stream experiment at 150° C. Its activity and stability are sustained regardless of the presence or absence of water in the feed.

The significance of the invention lies in the development of a $CuO$—$CeO_2/Nb_2O_5$ catalyst that enables low-temperature catalytic processes that attains full oxidation and using non-noble transition metals as the active components. This catalyst is developed using non-noble metal oxides consisting of copper oxide and cerium oxide supported on niobium oxide, which are much more affordable and readily available compared to noble metals like platinum and palladium, which are of high cost and limited availability. As a CO oxidation catalyst, it is engineered to possess a variety of desirable physicochemical properties, including a wide operating temperature range, no need for pre-use activation, the capability for regeneration, and an extended lifespan. The significant activity exhibited by the catalyst, achieving total CO oxidation at relatively low temperature of 150° C., makes it a feasible solution for converting CO to $CO_2$. The enhanced catalytic activity is attributed to the synergistic interaction between cerium oxide, copper oxide, and niobium oxide, which results in the formation of a solid solution closely associated with the generation of oxygen vacancies and active sites. Furthermore, the $CuO$—$CeO_2/Nb_2O_5$ catalyst exhibits long-term stability under operating conditions, ensuring durability and consistent performance over time. It resists deactivation when exposed to $CO_2$ and $H_2O$ in the feed gas stream or under high CO loads. This resistance to deactivation is a significant advantage over noble metal-based catalysts such as Au, Pt, Rh, Pd, which, despite their higher catalytic activity, suffer from rapid deactivation under high CO loads due to significant amount of CO adsorption on the surface of the noble metal that can poison the catalyst. Other transition metal oxides like cobalt, nickel, manganese, and iron oxides, are also unstable and prone to deactivation when exposed to $CO_2$ and $H_2O$ in the feed gas stream. Thus, the 10CuCeNb catalyst offers a cost-effective, efficient, and stable solution for catalytic converters, addressing both economic and environmental concerns.

The 10CuCeNb catalyst discussed herein can be employed in catalytic converters to mitigate harmful gases that threaten human health, such as carbon monoxide (CO). These converters transform CO into less harmful compounds through low-temperature catalytic processes. This invention offers several notable benefits: 1) Cost-Effectiveness: The 10CuCeNb is a cost-effective alternative to noble metal catalysts for catalytic converters. This approach addresses the cost factor associated with noble metals, significantly reducing the overall cost of catalytic converters, which is largely influenced by the cost of the catalyst itself. 2) High Efficiency: The catalyst is highly efficient, achieving total oxidation of CO at temperatures as low as 150° C., which demonstrates its feasibility for CO oxidation to $CO_2$. 3) Stability and Durability: The 10CuCeNb catalyst maintains high stability and consistent performance over extended periods, which is crucial for practical industrial applications. Its durability under real operating conditions ensures reliable long-term use. Given these advantages, the 10CuCeNb catalyst is highly suitable for the development of catalytic converters and underscores its potential for long-term use in catalytic applications. It can be applied in the manufacturing of catalytic converters for vehicles, energy industries, and heating systems to reduce CO emissions as well as by companies offering environmental solutions. Its effectiveness and sustainability in reducing CO emissions make it ideal for mitigating pollution across various industrial applications and the automobile industry.

In an embodiment of the present invention, transition metals such copper with low valence ions is introduced through doping into Cerium oxide ($CeO_2$). Cerium oxide plays a vital role in providing high oxygen storage capacity and creating oxygen vacancies, which are crucial for CO oxidation. Doping $CeO_2$ with low valence ions disrupts the charge balance within the ceria lattice structure. This disruption leads to the creation of oxygen vacancies or surface defects within the ceria lattice, which are essential for CO oxidation. These vacancies serve as active sites for the adsorption and activation of CO molecules, facilitating their conversion into less harmful compounds. Incorporation of CuO and $CeO_2$ into niobium species creates highly distorted octahedrally coordinated $NbO_6$ species. These species that act as Lewis acid sites, form Nb—O—Ce bonds, and generate substantial number of oxygen vacancies crucial for CO oxidation. CO molecules chemisorb on the catalyst interface during oxidation, forming Cu-carbonyl species that are oxidized to $CO_2$ by lattice oxygen, following the Mars-van Krevelen (MvK) mechanism route. Cu-carbonyl species being oxidized by the interface lattice oxygen, leaves an oxygen vacancy (Ov) that is then filled by adsorbed oxygen, which can react with another carbonyl species, allowing continuous $CO_2$ formation.

Cerium oxide and copper oxide are selected as key components of the catalyst due to their advantageous properties. Cerium as a catalyst is highly effective in various applications, including CO oxidation, the water-gas shift reaction, and hydrocarbon conversion. Cerium oxide has garnered significant interest among non-precious metal catalysts due to its exceptional oxygen storage capacity. This capacity stems from its ability to switch between $Ce^{4+}$ and $Ce^{3+}$ cations, enabling the redox couple to transform readily and generate oxygen vacancies within the lattice. These vacancies prevent the sintering of the supported metal or metal oxide phase by creating robust surface bonding interactions. However, pure ceria has poor thermal stability. Incorporating metals or metal oxides into its crystal structure can enhance its activity and thermomechanical properties. These incorporated elements can improve electron transfer rates by influencing surface structure and adsorption site acidity. The introduction of transition metals through doping into $CeO_2$ can create oxygen vacancies or surface defects within the ceria lattice, which are crucial for CO oxidation. Mixed metal oxides have received more attention mainly because of their improved mechanical stability, selectivity, and reducibility. Doping of $CuO/CeO_2$ catalysts is particularly active for full CO oxidation, with activity several orders of magnitude higher than traditional Cu-based catalysts and comparable or superior to Pt-based catalysts. Well-dispersed Cu over ceria catalysts has shown effective performance for CO oxidation both in the presence and absence of hydrogen. The co-precipitation method has been reported for synthesizing copper oxide supported on $CeO_2$ catalysts. The initial step in preparing any catalyst with high activity and ease of preparation involves selecting the appropriate synthesis method. This disclosure employs the wet impregnation method, involving calcination at high temperatures. The highest activity is achieved when the catalyst is calcined at a very high temperature because a highly stable Cu—$CeO_2$ solid solution is formed. Particularly, the CO oxidation activity of copper oxide supported on cerium oxide exceeds that of $Pt/Al_2O_3$. The CuO—$CeO_2$ system demonstrates high activity due to the development of sites at their interface where CO can easily extract oxygen to create $CO_2$. A major issue with $CuO/CeO_2$ system catalysts is the high cost of ceria, which the present invention addresses by using niobium oxide.

In an embodiment of the present disclosure, Niobium is another trace element that has been used as a support in catalytic process. Niobium oxides serve as an excellent catalytic promoter in heterogeneous processes. The impact of Nb-incorporated catalysts that is found to be most significant is the enhanced redox characteristics and the development of active acidic sites which boost the activity of catalyst. While cerium oxide is commonly used as a catalyst support, we opted for niobium oxide as a more cost-effective alternative. Niobium oxide offers similar benefits to cerium oxide but at a lower cost, making it a more practical choice for large-scale applications.

In an embodiment of the present invention, the specific preparation method of the catalyst involves the wet impregnation technique with varying loading levels, wherein pre-determined amount of copper and cerium oxides are combined with a pre-determined mass of niobium oxide in a controlled manner to form a slurry, followed by calcination. The wet impregnation method is used as an appropriate method in preparing the catalyst with high activity and ease of preparation. In another embodiment of the invention, the wet impregnation method involves combining 10 weights % of $CeO_2$ and copper precursor to create a solution. This solution is then carefully added dropwise to a predetermined mass of niobium oxide until a slurry-like mixture is formed. The mixture is stirred at 70 rpm and maintained at 30° C. for 1 hour before being placed in an oven at 105° C. overnight. Subsequently, the catalyst 10CuCeNb undergoes calcination at 500° C. for 4 hours in the presence of a flow of 50 ml/min of zero air to remove impurities and convert the precursors into their oxide forms.

In an embodiment of the invention, the effectiveness of the catalyst is assessed by measuring the catalytic activity and performance of 10CuCeNb in CO oxidation. The effectiveness of catalysts depends on their ability to achieve the desired outcomes of converting CO to $CO_2$, which in turn, reflects its feasibility in practical applications. To assess the catalytic performance for CO oxidation, experiments are conducted using a continuous-flow fixed-bed reactor system at 1 atm pressure over a temperature range of 100-600° C. The reactor configuration comprises a quartz tube placed within a temperature-controlled electric vertical furnace in which mass of 0.5 g of the prepared catalyst is supported by two quartz wool plugs within the reactor. The feed stream consists of 10 vol. % CO, 20 vol. % $O_2$, and the remaining balance of Ar. The feed stream is adjusted to a total flow rate of 150 cm³ min using digital mass flow controllers. Product analysis is performed using an online gas chromatograph (such as GC-TCD). The CO conversion under steady state was calculated by the given Equation (1):

$$X\ \% = \frac{[CO]_{out} - [CO]_{in}}{[CO]_{out}} \times 100 \tag{1}$$

Where X % denotes the percentage conversion of CO, and outlet and inlet concentrations of CO are represented as $[CO]_{out}$ and $[CO]_{in}$ respectively. Notably, the developed catalysts demonstrate high activity, achieving complete CO conversion (total oxidation) to $CO_2$ at a relatively low temperature of 150° C. The synergistic interaction between cerium oxide, copper oxide and niobium oxide results in the formation of a solid solution closely associated with the generation of oxygen vacancies and active sites, thereby enhancing the activity of the catalysts. In another embodiment of the invention, the catalytic activity is confirmed through various characterization analyses conducted on the developed catalysts.

In an embodiment of the present invention, the stability of the developed catalyst is assessed. The practical utilization of a catalyst in industries heavily relies on its ability to maintain stability under real operating conditions and consistent performance over time. In one embodiment, a 12-hour time-on-stream experiment is conducted to evaluate the long-term stability of the developed catalyst at 150° C., under identical conditions and feed composition for 12 hours. The CO conversion rate per hour is measured to evaluate stability. The CO conversion rate remains nearly constant and high throughout the entire 12-hour duration, indicating stable performance over time. This observation highlights the catalyst's exceptional stability and suitability for long-term use in catalytic converters.

The developed catalyst as proposed here, demonstrates high activity in achieving full oxidation of CO at a relatively low temperature in the catalytic activity test. These findings are validated in another embodiment of the invention, using kinetic values. The kinetics values are calculated, including the rate of reaction and activation energy, to verify the activity of the developed catalyst. The 10CuCeNb catalyst exhibits the lower activation energy of Ea=21.3 kJ mol$^{-1}$, enabling the CO oxidation reaction to occur at lower temperatures or with less energy input. In different embodiments of the present disclosure, various characterization analyses of the catalyst are conducted for comprehending the physiochemical properties of the prepared catalysts and their effect on the desired catalytic activity. The analyses comprise employing various techniques such as X-ray diffraction (XRD), Fourier transform infrared (FT-IR), Transmission electron microscopy (TEM), combined Diffuse reflectance infrared Fourier transform spectroscopy (DRIFTS) measurements and density-functional theory (DFT) computations which confirm the interaction of niobium oxide and cerium oxide that cause the high activity within the low temperature range during the oxidation mechanism.

The FTIR spectra of the prepared samples confirm the incorporation of CuO and $CeO_2$ into the niobium species. This incorporation results in the creation of highly distorted octahedrally coordinated $NbO_6$ species. These species serve as Lewis acid sites and promote the formation of Nb—O—Ce bonds, generating a substantial number of oxygen vacancies crucial for the CO oxidation process.

In an embodiment of the present invention, DRIFTS analysis is conducted to investigate the mechanism of CO adsorption on catalyst surface. The CO adsorption on catalyst surface follows the Mars-van Krevelen (MvK) mechanism route, as confirmed by in situ DRIFTs analysis. In a further embodiment of the invention, the DFT computations demonstrate the mechanisms for the oxidative transformation of CO into $CO_2$. The CO molecules chemisorb on the interface of the prepared catalyst, leading to the formation of Cu-carbonyl species. These species are subsequently oxidized by the interface lattice oxygen, resulting in $CO_2$ species, and leaving an oxygen vacancy ($O_v$) at the interface. Finally, the oxygen vacancy is filled by adsorbed oxygen, which can react with another carbonyl species, allowing continuous $CO_2$ formation.

The present solution addresses the development of a cost-effective catalyst with high activity and selectivity for the CO oxidation reaction, both in the presence and absence of $H_2O$ in the feed stream, under low-temperature conditions. In an embodiment of the proposed solution, ceria and niobium oxide doped with CuO, and precursors of CuO—$CeO_2$ supported on niobium oxide with different loadings, are prepared using the wet impregnation method. These prepared samples are subsequently tested for CO oxidation, and a comparative study of their activity is conducted. In this regard, different Cu-doped ceria and niobium-supported catalysts are prepared, characterized, and tested for the reaction. The desired catalysts are prepared using the wet impregnation method as detailed elsewhere. The procedures for preparing niobium oxide-supported catalysts are followed, resulting in catalysts denoted as 5CuNb, 10CuNb, and 15CeNb. For mixed oxides of copper oxide and cerium oxide acting as precursors and supported on niobium oxide, appropriate percentages, specifically X % CuO—Y % $CeO_2$/(100-(X+Y) % $Nb_2O_5$ are prepared, where X, Y=5% and 10%, respectively. In the synthesis of all samples, Copper (II) nitrate trihydrate ($Cu(NO_3)_2 \cdot 3H_2O$), $CeO_2$ micro-powder, and ammonium niobate (V) oxalate hydrate ($C_4H_4NNbO_9$) are utilized as precursors for CuO, $CeO_2$, and $Nb_2O_5$; respectively. Accordingly, the correct quantities of $CeO_2$ micro-powder (Sigma-Aldrich, >99%) and copper oxide salt are slowly introduced into a stirring solution of ammonium niobate (V) oxalate hydrate ($C_4H_4NNbO_9$) solution. This mixture is then dried overnight and undergoes calcination for 4 hours at 400° C. in static air at a flow rate of 100 ml/min. These catalysts are denoted as 5CuCeNb and 10CuCeNb, where the weight percentages of Cu and Ce are 5% and 10%, respectively.

In another embodiment according to the present disclosure, catalytic run experiments are conducted to evaluate the effectiveness and efficiency of the prepared catalysts in oxidizing CO. The carbon monoxide oxidation experiments are carried out in a tubular quartz reactor positioned at the centre of an electrically heated furnace. The temperature range varies from 100 to 400° C., with intervals of 50° C., and the reactor operates at atmospheric pressure. In each experiment, a fixed amount of catalyst (0.5 g) is placed in the middle of the reactor tube and secured using ultra-pure quartz wool. The total flow rate of the feed stream (10% CO, 20% $O_2$, with the remaining balance of Ar) is 150 $cm^3$ $min^{-1}$, adjusted using digital mass flow controllers. The weight hourly space velocity (WHSV) of the reactants is set at 18000 $cm^3 g^{-1} h^{-1}$ for the experiments. The products leaving the reactor are analysed using a Micro GC. In another embodiment, to evaluate the catalyst's performance under moisture conditions, the feed gas is passed through a water vapor saturator at a flow rate of 150 ml/min, maintaining the previously mentioned feed composition. The CO conversion under steady state is calculated by the Equation (1):

$$X \% = \frac{[CO]_{out} - [CO]_{in}}{[CO]_{out}} \times 100 \qquad (1)$$

Where X % is the percentage conversion of CO and outlet and inlet concentrations of carbon monoxide are represented as $[CO]_{out}$ and $[CO]_{in}$ respectively. The criteria for the absence of external and internal mass transport resistances are accordingly satisfied. The rate of reaction is calculated by using the below Equation (2) and the activation energy, Ea of the catalysts is estimated by linear fitting of the Arrhenius equation represented as Equation (3):

$$\text{Rate}_{CO} = \frac{F_{CO} \times X_{CO}}{W} \qquad (2)$$

$$k = Ae^{\frac{-Ea}{RT}} \qquad (3)$$

where $F_{CO}$ represents the volumetric flow rate of CO inlet into the feed stream and $X_{CO}$ denotes the conversion of CO, and W stands for the weight of the catalyst used in the reaction; k denotes the rate constant of the reaction, T the absolute temperature, A is the pre-exponential factor/Arrhenius factor, e is the Euler's number and R the universal gas constant. To estimate the kinetic parameters Ea (activation energy) and rate of the equation, the CO oxidation reaction is carried out within a temperature range of 80-150° C. to keep CO conversion below 15%, using a feed gas composition of 10% CO/20% $O_2$/Ar.

In an embodiment of the proposed solution, the catalytic activity and reaction kinetics are analyzed. The oxidation of CO over different catalysts is examined, and conversion is measured under the above-mentioned conditions. In all cases, the change in catalytic activity toward CO oxidation is explicit in the percentage of CO conversion as a function of temperature. FIG. 1 represents the light-off curves of CO oxidation reaction obtained over the different prepared catalysts. FIG. 1 also shows the comparative results of $T_{100}$ (° C.) conversion temperature for all the prepared catalysts. From this figure, the base catalyst containing 15% cerium oxide supported on niobium oxide shows poor catalytic activity among all the catalysts. The results suggest that CO activity improves as copper oxide is introduced into cerium oxide supported on a niobium oxide matrix. In the absence of water vapor in the inlet feed, the 10CuCeNb catalyst demonstrates exceptional performance for CO conversion among all the catalysts used, with full CO conversion at 150° C. In this experiment, two different supported catalysts are prepared as mentioned earlier. In the first case, Cu-doped cerium oxide is examined and shows better conversion as the loading of copper gradually increases with temperature. The 10CuCe catalyst shows better performance with 100% CO conversion at 350° C. compared to the 5CuCeNb catalyst, which exhibits full conversion at a slightly higher temperature. The ability of the supported catalyst to oxidize CO is greatly affected by the redox properties of the support materials. The increased activity of the catalyst with increased loading of Cu % can be attributed to the synergistic effect between ceria and CuO, through the creation of a partial solid solution.

Figure 2:
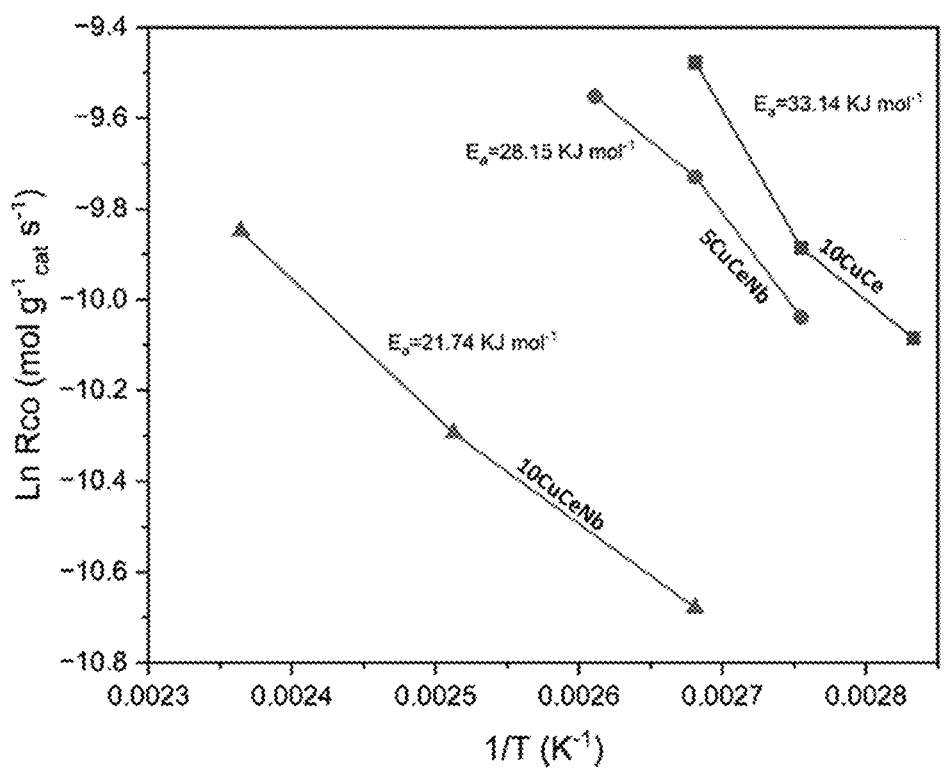
FIG. 2 shows the Arrhenius plots of catalytic CO oxidation over three best-performing catalysts, 10CuCeNb, 5CuCeNb, and 10CuCe, in accordance with the present invention.

In the second case, the catalyst support is changed from cerium oxide to the cheaper alternative of niobium oxide. It is found that increasing the Cu % loading decreases the activity of CO oxidation. Comparing the $T_{100}$ values (from FIG. 1) of the two catalysts, it is evident that the addition of cerium oxide to $CuO/Nb_2O_5$ increases the CO oxidation activity. The same weight percentage as 10% of CuO and Cerium oxide act as precursor supported on Niobium oxide shows exceptional performance with $T_{100}$~150° C., followed by the 5CuCeNb catalyst, which achieves maximum CO conversion at the temperature of 350° C. The improved catalytic activity can be attributed to the combined effects of niobium, which facilitates the formation of Nb(V) oxide sites, and its contribution to altering the stoichiometry of ceria. The inclusion of $Ce^3$ ions has a positive impact on the creation of oxygen vacancy defects. Additionally, the redox-active connections between ceria (Ce) and niobium (Nb), such as Ce—O—Ce and Ce—O—Nb, create additional oxygen vacancies. These vacancies play a crucial role in facilitating the oxidation of the reactant over the catalyst surface, making the process more efficient. The apparent activation energy for the CO oxidation reaction is estimated for three best-performing catalysts: 10CuCeNb, 5CuCeNb, and 10CuCe and FIG. 2 represents the corresponding Arrhenius plots of catalytic CO oxidation over these catalysts. By plotting the Arrhenius graph with the ln of the reaction rate against the inverse of temperature, the Ea values are determined to range from 21.3 to 33.14 KJ $mol^{-1}$. As expected, the best-performing catalyst 10CuCeNb exhibits the lowest activation energy, Ea=21.3 KJ $mol^{-1}$, as it enables the CO oxidation reaction to take place at lower temperatures or with less energy input, followed by the 5% CuO and cerium oxide supported on niobium oxide with an Ea of 28.15 KJ $mol^{-1}$. The Ea value of 33.14 KJ $mol^{-1}$ for copper oxide supported on niobium oxide aligns with previous studies, confirming its accuracy.

The performance of the catalysts used herein is demonstrated by the CO conversion profile, which compares favourably to previous reports. For instance, a high surface area modified ceria catalyst achieves 50% CO conversion at 320° C. under similar conditions. Similarly, lanthanum-doped ceria and trace metal-doped (M: La and Pr) catalysts exhibit approximately 50% CO conversion at temperatures above 300° C. Additionally, it is observed that the CuO—$CeO_2$ system supported on other oxides, such as $Al_2O_3$, shows complete CO conversion at temperatures exceeding 200° C. These findings highlight the reasonable performance of the catalysts employed in this disclosure.

Figure 3:
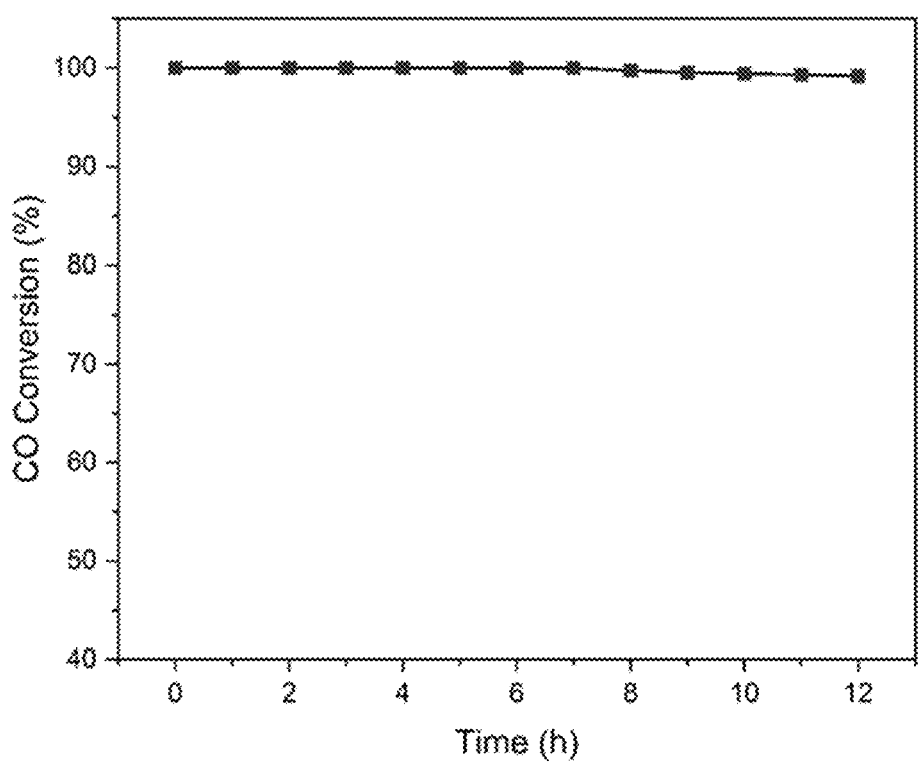
FIG. 3 shows the stability test of 10CuCeNb, with reaction condition: feed gas—10% CO, 20% $O_2$, balance with Ar, reaction temperature 150° C., run time 12 hours, in accordance with the present invention.

In another embodiment of the invention, the stability test is conducted on the prepared catalysts. The industrial application of a catalyst greatly depends on its stability during real operating conditions, highlighting the importance of ensuring its durability and performance over time. Hence, a 12-hour time-on-stream experiment is conducted to examine the long-term stability of the best-performing catalyst, 10CuCeNb, at 150° C. FIG. 3 represents the stability test of 10CuCeNb, with the reaction condition: feed gas—10% CO, 20% $O_2$, balance with Ar, reaction temperature 150° C., run time 12 hours. The figure shows that the CO conversion rate remains nearly constant throughout 12 hours, suggesting that the catalyst exhibits high stability over time. A further embodiment involves the Raman spectroscopy analysis of 10CuCeNb, and it is concluded that no carbon is detected in the spent catalyst, indicating that no deactivation of the catalyst occurs during the stability testing period.

The high activity and catalytic performance exhibited by the proposed catalyst 10CuCeNb is attributed to the synergistic interaction between cerium oxide, copper oxide, and niobium oxide, which is a key feature that significantly enhances the catalyst's effectiveness. This interaction results in the formation of a solid solution that generates oxygen vacancies, thereby enhancing the catalytic activity. Doping $CeO_2$ with transition metals that have low valence ions disrupts the charge balance within the lattice structure. To maintain charge neutrality, this disruption leads to the formation of oxygen vacancies or surface defects within the ceria lattice. These vacancies and defects are crucial for CO oxidation, as they enhance the catalyst's ability to adsorb and activate oxygen molecules. These surface defects or oxygen vacancies change the nearby electronic configuration, significantly affecting surface reactivity. According to the Volkenshtein electronic theory, the presence of defect sites associated with oxygen vacancies ($O_v$) modifies the Fermi energy level. This modification facilitates oxidation processes by making it easier for the catalyst to interact with and oxidize reactant molecules. The altered electronic environment due to these vacancies provides active sites that are more conducive to the adsorption and activation of oxygen, thereby improving the overall catalytic efficiency for CO oxidation. In bare ceria, $Ce^{4+}$ is reduced to $Ce^{3+}$ by CO, resulting in the formation of an $O_v$. When the vacancy forms, two excess electrons are left behind and fill the 4f orbitals of $Ce^{4+}$, converting it to $Ce^{3+}$. The feed gas $O_2$ then reacts with the solid surface to fill the created oxygen vacancy $O_v$, a process known as $O_2$ activation, during which highly active atomic oxygen species are generated. Finally, CO reacts with these highly active atomic oxygen species to form $CO_2$. According to the disclosure, niobium oxide acts as a support while cerium and copper oxide act as promoters.

Figure 4:
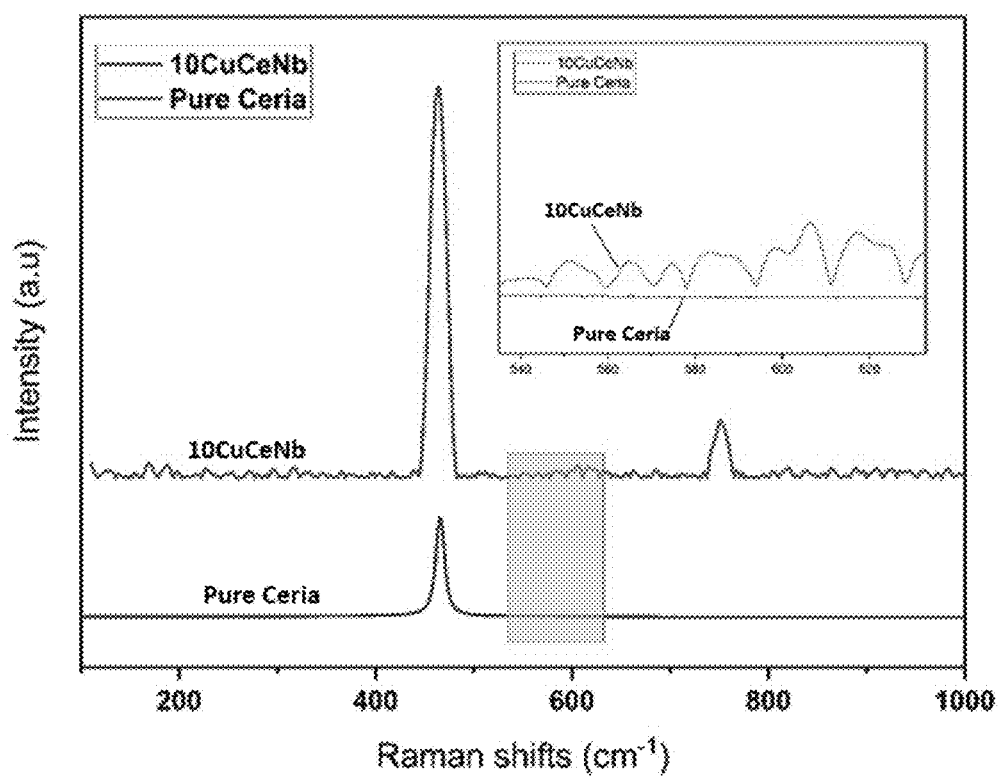
FIG. 4 shows the Raman spectra of pure ceria and 10CuCeNb, in accordance with the present invention.

To support this key feature, in another embodiment of the present invention, the effects of doping niobium oxide with cerium oxide and copper oxide are investigated. Results reveal a contraction in the lattice constant of the prepared catalysts. This contraction suggests that Nb and Cu nanoparticles have successfully embedded into the ceria matrix after interaction. This embedding is likely due to the substitution of $Ce^{4+}$ ions with $Nb^{5+}$ or $Cu^{2+}$ ions, which have smaller ionic radii. Specifically, niobium has an ionic radius of 0.64 Å and copper has an ionic radius of 0.72 Å, both of which are smaller than the ionic radius of cerium, which is 0.97 Å. The smaller ionic radii of niobium and copper allow them to fit into the ceria lattice, leading to the observed contraction. This synergistic interaction results in the formation of a solid solution, which creates defects closely linked to the generation of oxygen vacancies. These oxygen vacancies facilitate achieving the reaction at lower temperatures. To further confirm these interactions that cause the defects, Raman analysis of pure ceria and the claimed catalyst is conducted to analyse the differences after the incorporation of these nanoparticles. FIG. 4 depicts the Raman spectra of pure ceria and 10CuCeNb, which shows the defects in the 540-620 $cm^{-1}$ region, generally known as the defects region. This clearly indicates that doping induces the generation of defects in the structure. In pure ceria, only one peak is detected at 465 $cm^{-1}$, the $F_{2g}$ peak, but in the doped catalyst 10CuCeNb, another peak is detected at 751 $cm^{-1}$ apart from $F_{2g}$ due to the existence of highly distorted octahedrally coordinated $NbO_6$ species, which function as Lewis acid sites. This interaction between niobium oxide and cerium oxide leads to the formation of Nb—O—Ce bonds, generating a significant number of oxygen vacancies, which play a crucial role in the CO oxidation process and achieving full oxidation at a lower temperature.

Figure 5:
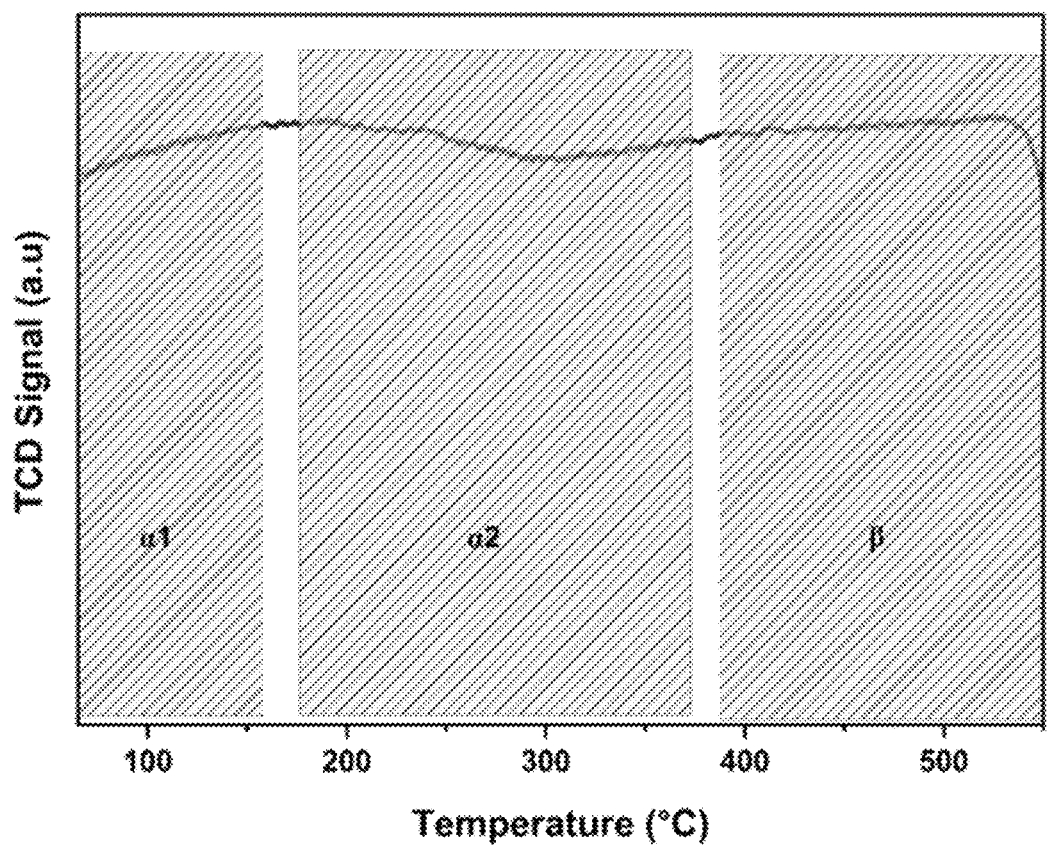
FIG. 5 shows $O_2$-TPD profiles of 10CuCeNb, in accordance with the present invention.

In another embodiment, $O_2$-TPD experiments are conducted to analyse the nature of oxygen on the catalyst surface. The active oxygen species present on the catalyst surface are recognized to play a crucial role in enhancing catalytic activity in oxidation reactions. FIG. 5 represents the $O_2$-TPD profiles of 10CuCeNb. As depicted in FIG. 5, three types of oxygen are distinguishable across distinct temperature ranges. Peaks observed around the first region are likely attributed to physically adsorbed oxygen or $O^{2-}$ species (referred to as a1). The other distinct region within the temperature range of 170-380° C. is indicative of surface chemisorbed oxygen, denoted as $O_{ads}$ (referred to as α2). Peaks observed between 38° and 600° C. are attributed to surface lattice oxygen (referred to as β). In the third region, prominent peaks indicate that the incorporation of ceria and copper into niobium promotes the formation of $O^{2-}$ (ad), which is important for the CO oxidation reaction. This experiment concludes that a prominent amount of oxygen is available, which facilitates the CO oxidation reaction.

In conclusion, this disclosure investigates the capability of novel 10% $CuO$—$CeO_2/Nb_2O_5$ catalysts for low-temperature CO oxidation under atmospheric conditions. In this regard, Ceria and Niobium Oxide doped with Cu and precursors of $CuO$—$CeO_2$ supported on Niobium Oxide with different loadings are prepared, characterized, and tested for the CO oxidation reaction. Among all the prepared catalysts, 10% $CuO$—$CeO_2/Nb_2O_5$ shows high CO oxidation activity with full conversion at a relatively low temperature (150° C.) due to the synergistic effects between $CuO$, $CeO_2$ and the support $Nb_2O_5$ while remaining stable over time. The CO conversion of the best-performing catalyst remains relatively stable throughout a 12-hour time-on-stream test in the absence of water in the feed. Additionally, the kinetics parameters determined reveal activation energy (23.1 kJ $mol^{-1}$) inversely following CO activity trends. This development opens up possibilities for the practical use of affordable and highly efficient catalyst materials in cost-effective technologies to reduce CO emissions. The catalyst is used to convert CO, which poses harmful effects to humans, plants, animals, and the environment, into less harmful $CO_2$ compounds, thereby reducing CO emissions and mitigating its detrimental impacts. As a cost-effective alternative to expensive noble catalysts, this catalyst offers a sustainable and efficient solution to pollution. The proposed catalyst is particularly applicable in the automotive industry for manufacturing catalytic converters for vehicle exhaust systems. Additionally, it can be employed in various industrial processes that generate toxic gases, including energy-related industries and heating systems, as well as by companies providing environmental solutions.

Benefits of the proposed 10CuCeNb catalyst for CO oxidation in accordance with the present invention include the catalyst offering a cost-effective alternative to noble metal catalysts for catalytic converters, high efficiency by achieving total oxidation of CO at low temperatures as low as 150° C., and high stability and maintenance of performance over extended periods, crucial for catalytic converter development.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A method for catalytic oxidation of carbon monoxide (CO) to carbon dioxide ($CO_2$), comprising:
   providing a non-noble catalyst, designated as 10CuCeNb, composed of 10 weight % of Copper oxide (CuO)-Cerium oxide ($CeO_2$) precursors, supported on Niobium oxide ($Nb_2O_5$);
   calcining the non-noble catalyst 10 CuCeNb in the presence of a flow of 50 ml/min of zero air to remove impurities and covert the precursors into their oxide forms
   exposing a CO containing gas stream to the calcined non-noble catalyst 10 CuCeNb composition at a temperature as low as 150° C.; and
   oxidizing the CO to $CO_2$,
   wherein the catalyst exhibits enhanced activity due to synergistic interaction between the Copper oxide (CuO)-Cerium oxide ($CeO_2$) i.e., CuO-doped $CeO_2$ and the $Nb_2O_5$, and achieves complete CO oxidation at a temperature of 150° C.

2. The method of claim 1, wherein the CO containing gas stream comprises 10 vol. % CO and 20 vol. % Oxygen ($O_2$) with the balance being argon (Ar), used in a continuous-flow fixed-bed reactor system.

3. The method of claim 2, wherein the catalyst exhibits an activation energy (Ea) of 21.3 kJ $mol^{-1}$, supporting CO oxidation at a temperature as low as 150° C. or with energy input of 23.1 kJ·$mol^{-1}$.

4. The method of claim 3, wherein the catalyst maintains stability and consistent CO conversion rates for at least 12 hours.

5. The method of claim 4, wherein CO oxidation follows the Mars-van Krevelen (MvK) mechanism route, wherein CO molecules chemisorb on the catalyst interface to form Cu-carbonyl species that are oxidized to $CO_2$ by lattice oxygen and an oxygen vacancy ($O_v$) thereby created in the lattice is subsequently filled by adsorbed oxygen, enabling continuous $CO_2$ formation.

6. The method of claim 5, wherein the synergistic interaction between the $CuO$—$CeO_2$ and the niobium oxide support creates a solid solution that generates oxygen vacancies, thereby enhancing catalytic activity.

7. The method of claim 6, wherein doping the copper oxide into the cerium oxide, disrupts charge balance within the ceria lattice to create oxygen vacancies, that serve as active sites for adsorption and activation of the CO molecules.

8. The method of claim 7, wherein the niobium oxide enhances redox characteristics and develops active acidic sites (Lewis acid sites) upon incorporation with the CuO and the $CeO_2$, thereby generating oxygen vacancies for CO adsorption and oxidation.

* * * * *